(12) United States Patent
Su

(10) Patent No.: US 8,646,642 B2
(45) Date of Patent: Feb. 11, 2014

(54) FLOATING COVER ROOF FOR A STORAGE TANK

(75) Inventor: Chin-Fa Su, Tainan (TW)

(73) Assignee: Float-Tek International Co., Ltd., Tainan (TW)

( * ) Notice: Subject to any disclaimer, the term of this patent is extended or adjusted under 35 U.S.C. 154(b) by 316 days.

(21) Appl. No.: 13/030,904

(22) Filed: Feb. 18, 2011

(65) Prior Publication Data

US 2012/0211490 A1 Aug. 23, 2012

(51) Int. Cl.
*B65D 88/34* (2006.01)

(52) U.S. Cl.
USPC ........... 220/216; 220/218; 220/222; 220/578; 285/405; 403/288; 403/335; 403/337; 403/338; 52/580; 52/582.1

(58) Field of Classification Search
USPC .................. 220/216, 218, 222, 578; 285/405; 403/288, 335, 337, 338
See application file for complete search history.

*Primary Examiner* — Anthony Stashick
*Assistant Examiner* — Elizabeth Volz
(74) *Attorney, Agent, or Firm* — Shimokaji & Associates P.C.

(57) ABSTRACT

A floating cover roof for a storage tank has a frame assembly and multiple floating units. The frame assembly has a holding frame and an outer rim. The holding frame has multiple longitudinal beams and transverse beams. Each longitudinal beam has a connecting seat, a first holding segment and a second holding segment. Two of the transverse beams are connected to two adjacent longitudinal beams to form a locating area between the beams. The floating units are mounted in the locating areas of the frame assembly, are connected to the beams of the holding frame and each has an outer casing and a body. The outer casing is mounted in one of the locating areas of the holding frame, is connected to the adjacent beams and has a casing body and a top board. The body is mounted in the outer casing between the casing body and the top board.

5 Claims, 6 Drawing Sheets

FLOATING COVER ROOF FOR A STORAGE TANK

BACKGROUND OF THE INVENTION

1. Field of the Invention

The present invention relates to a floating cover roof, and more particularly to a floating cover roof for a storage tank to reduce the VOC (volatile organic component) loss and enhance the structural strength of the floating cover roof.

2. Description of Related Art

A conventional storage tank has a tank shell and a floating cover roof. The tank shell is hollow and is used to storage fluid and has an internal surface. The floating cover roof floats on the surface of the storage fluid that is stored inside of the tank and can be moved upward or downward relative to the tank shell based on the height of the storage fluid and has an outer periphery and a sealing ring. The sealing ring is mounted around the outer periphery of the floating cover roof and abuts the internal surface of the tank to prevent the VOC escaping from the storage tank.

Two kinds of the conventional floating cover roofs are provided in the market. One kind of conventional floating cover roof has multiple pontoons to make the floating cover roof float over the surface of the storage fluid. However, the pontoons will form a gap between the floating cover roof and the surface of the storage fluid and this will cause the VOC loss easily.

With reference to FIG. 7, the other kind of conventional floating cover roof has multiple floating units 30 to make the floating cover roof float over the surface of the storage fluid. Each floating unit 30 has a honeycomb core 31 and two flat plates 32. The honeycomb core 31 has a top and a bottom. The flat plates 32 are respectively mounted on the top and the bottom of the honeycomb core 31. Thus, the conventional floating cover roof can float on and abut the surface of the storage fluid to prevent the VOC loss from the conventional floating cover roof. However, the flat plates 32 of each floating unit 30 are securely mounted on the corresponding honeycomb core 31 by glue, and the storage fluid may decompose the glue and cause the flat plates 32 to separate from the honeycomb core 31. In addition, the plates 31, 32 of each floating unit 30 can be securely connected to each other by high temperature melting operation. However, the high temperature melting operation needs an expensive high temperature melting apparatus to connect the plates 31, 32 with each other and this will increase the cost of production.

The floating cover roof for storage tank in accordance with the present invention mitigates or obviates the aforementioned problems.

SUMMARY OF THE INVENTION

The main objective of the invention is to provide a floating cover roof for storage tank that can reduce the VOC loss and enhance the structural strength of the floating cover roof.

The floating cover roof for storage tank in accordance with the present invention has a frame assembly and multiple floating units. The frame assembly has a holding frame and an outer rim. The holding frame has multiple longitudinal beams and multiple transverse beams. Each longitudinal beam has a cross section shape, a connecting seat, a first holding segment and a second holding segment. Two of the transverse beams are connected to two adjacent longitudinal beams to form a locating area between the corresponding beams. The floating units are respectively mounted in the locating areas of the frame assembly, are connected to the beams of the holding frame and each has an outer casing and a body. The outer casing is mounted in one of the locating areas of the holding frame between the corresponding beams, is connected to the adjacent beams and has a casing body and a top board. The body is mounted in the outer casing between the casing body and the top board.

Other objectives, advantages and novel features of the invention will become more apparent from the following detailed description when taken in conjunction with the accompanying drawings.

DETAILED DESCRIPTION OF PREFERRED EMBODIMENT

With reference to FIGS. 1 to 6, a floating cover roof for a storage tank in accordance with the present invention comprises a frame assembly 1 and multiple floating units 2.

Figure 4:
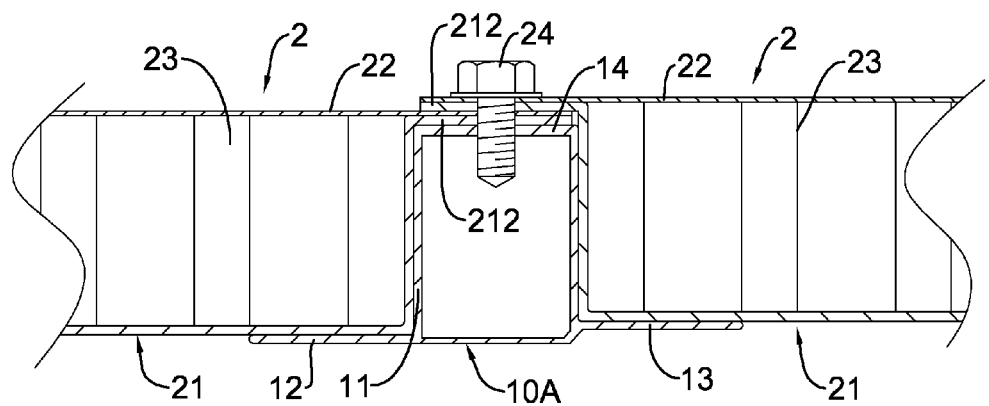
FIG. 4 is an enlarged side view in partial section of a first embodiment of the floating cover roof in FIG. 1.
Figure 5:
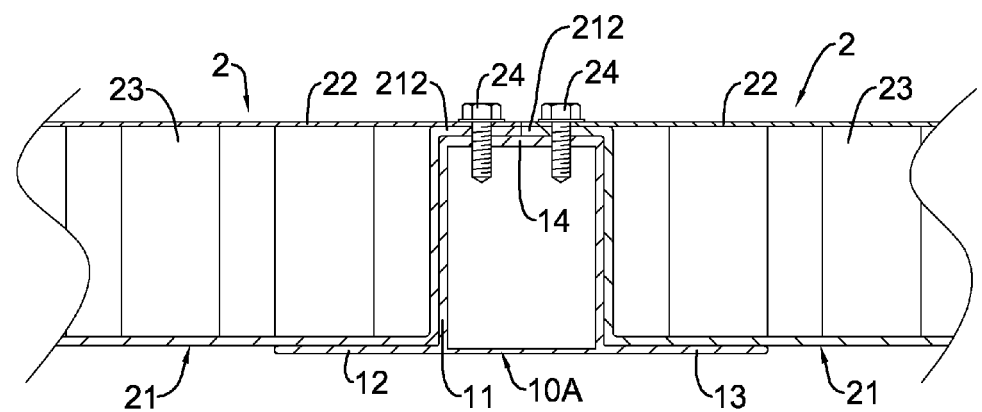
FIG. 5 is an enlarged side view in partial section of a second embodiment of the floating cover roof in FIG. 1.
Figure 6:
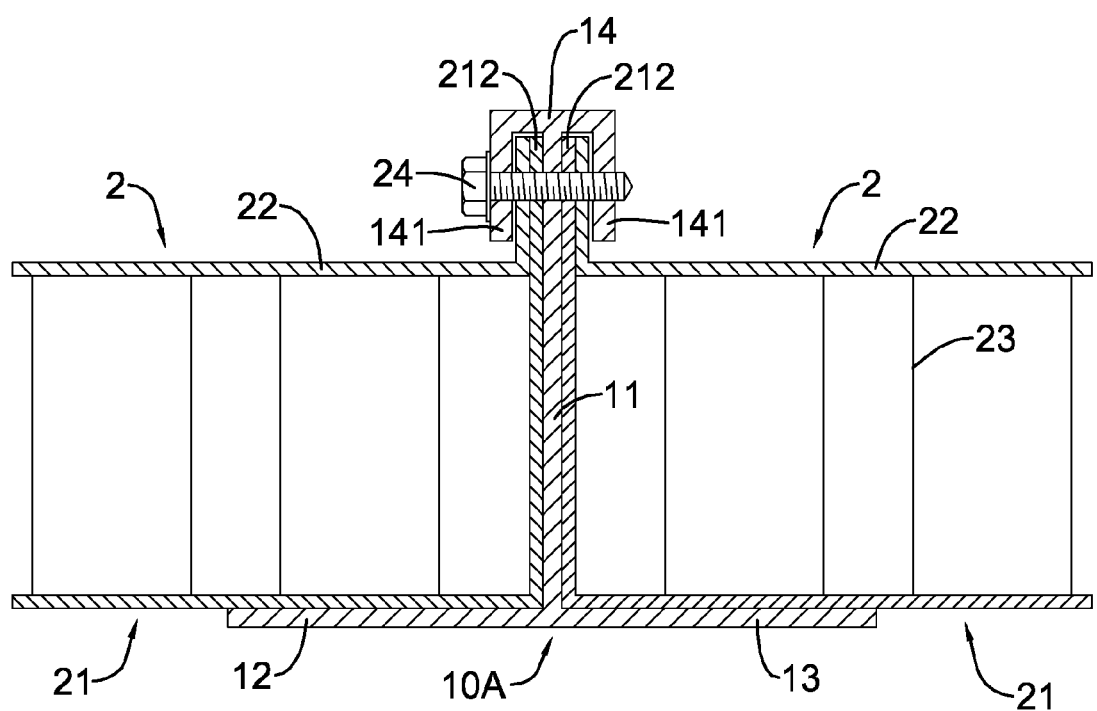
FIG. 6 is an enlarged side view in partial section of a third embodiment of the floating cover roof in FIG. 1.
Figure 7:
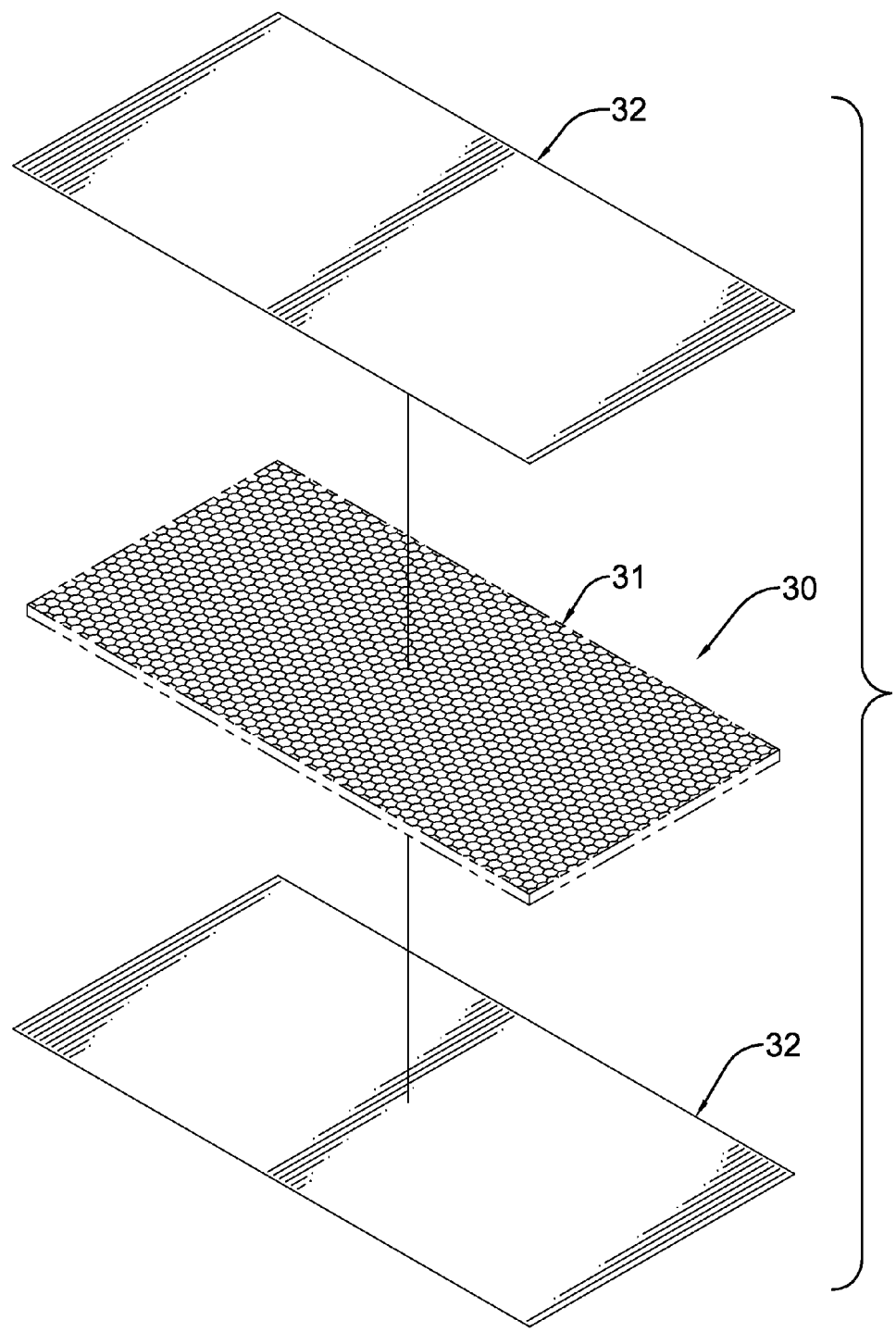
FIG. 7 is an exploded perspective view of a floating unit of a conventional floating cover roof in accordance with the prior art.

The frame assembly 1 has a holding frame 1A and an outer rim 1B. The holding frame 1A has an outer periphery, multiple longitudinal beams 10A, multiple transverse beams 10B and multiple locating areas 1C. Each longitudinal beam 10A has a cross sectional shape, a connecting seat 11, a first holding segment 12 and a second holding segment 13. The connecting seat 11 may be quadrate as shown in FIGS. 4 and 5 or T-shaped as shown in FIG. 6 and has a top, a bottom, two opposite sides and a fixed board 14. The fixed board 14 may be flat or bent, is formed on the top of the connecting seat 11 and has a width. With referenced to FIG. 6, the bent fixed board 14 has two side panels 141 facing each other. Each side panel 141 has a width.

The holding segments 12, 13 are respectively mounted on and protrude from the opposite sides at the bottom of the connecting seat 11, align with each other as shown in FIGS. 5 and 6 or misalign with each other as shown in FIG. 4 and each holding segment 12, 13 has a top face.

Two of the transverse beams 10B are connected to two adjacent longitudinal beams 10A to form a corresponding locating area 1C between the corresponding beams 10A, 10B. Each transverse beam 10B has the same cross sectional shape and structure as that of the longitudinal beam 10A. The outer rim 1B is mounted around the outer periphery of the holding frame 1A to hold the beams 10A, 10B of the holding frame 1A in the outer rim 1B.

Figure 1:
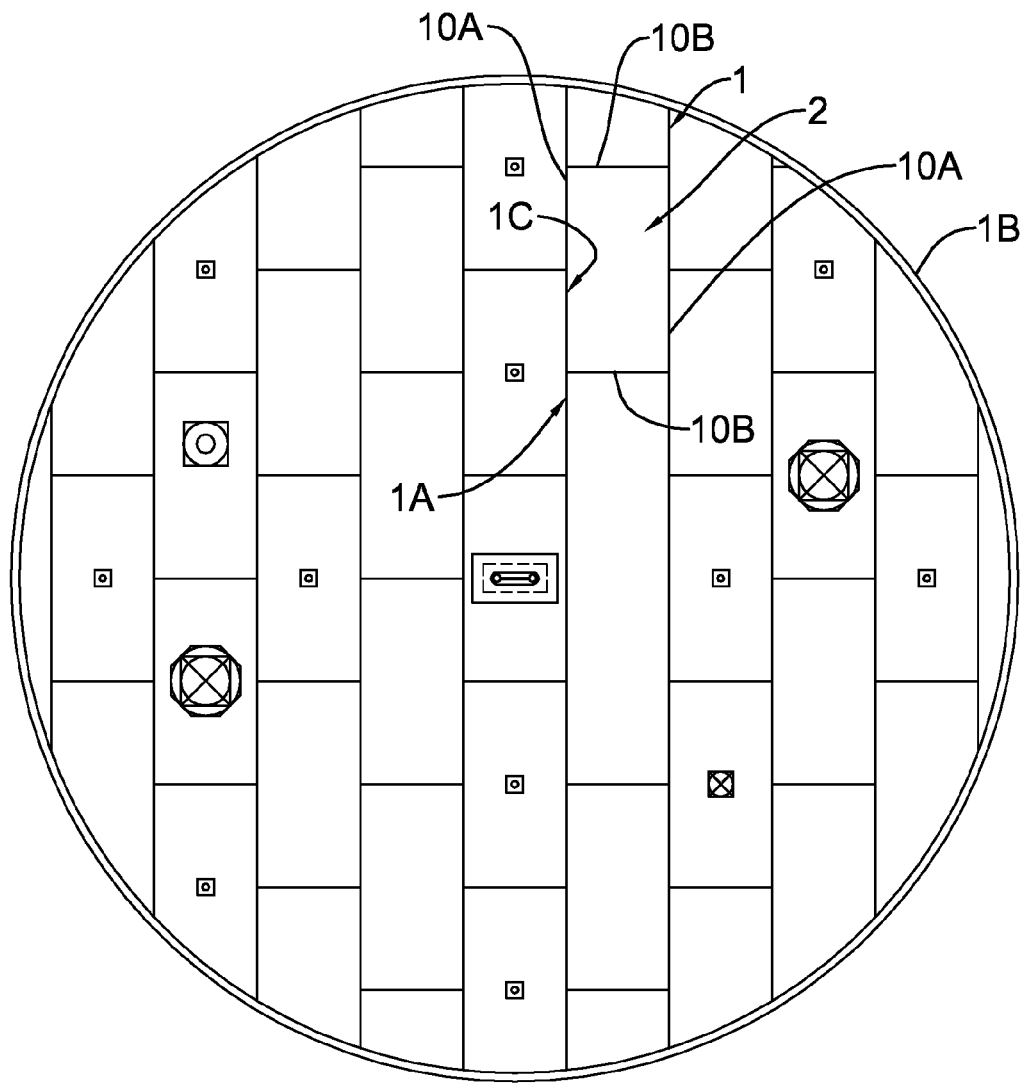
FIG. 1 is a top view of a floating cover roof in accordance with the present invention.
Figure 2:
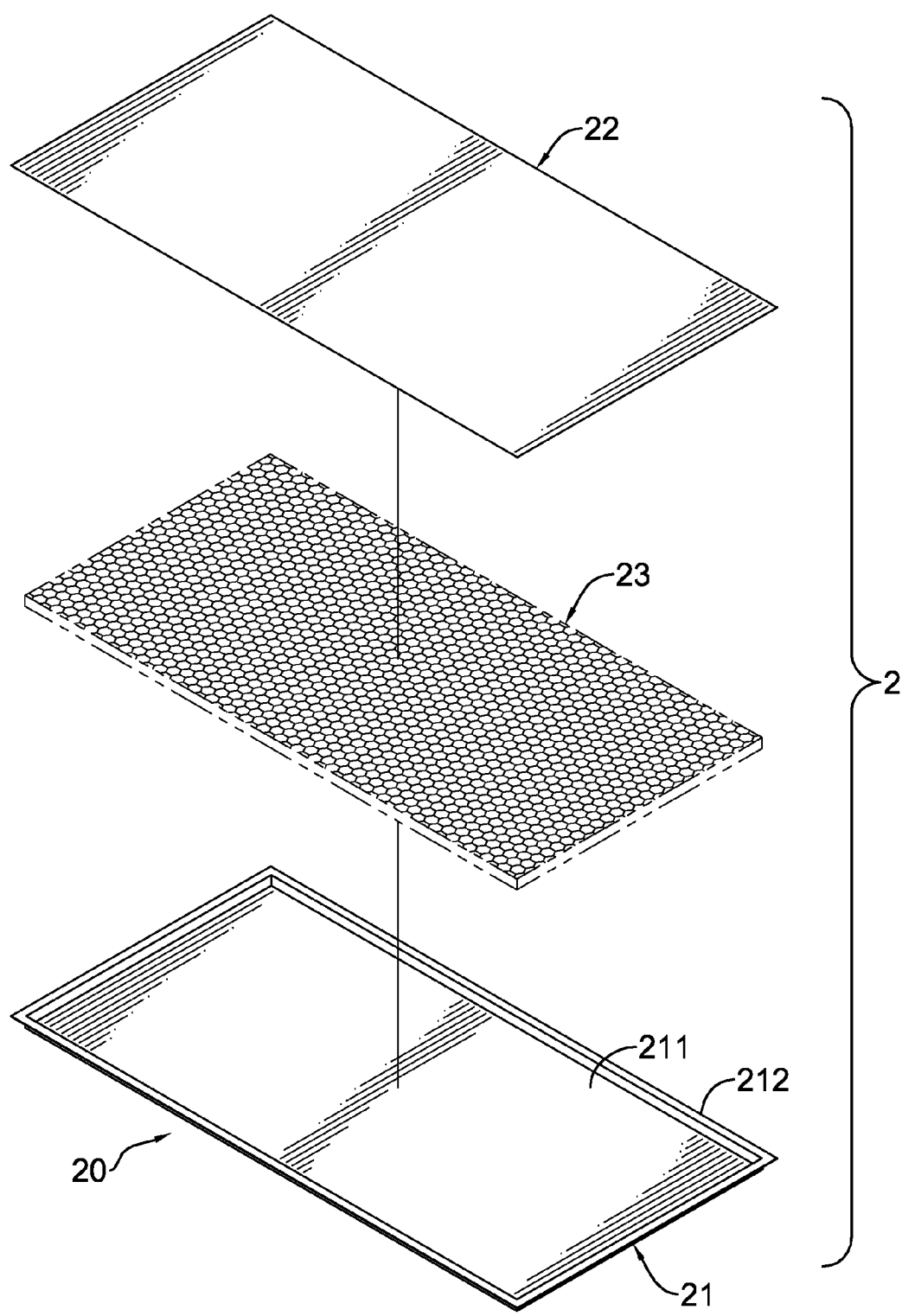
FIG. 2 is an exploded perspective view of a floating unit of the floating cover roof in FIG. 1.
Figure 3:
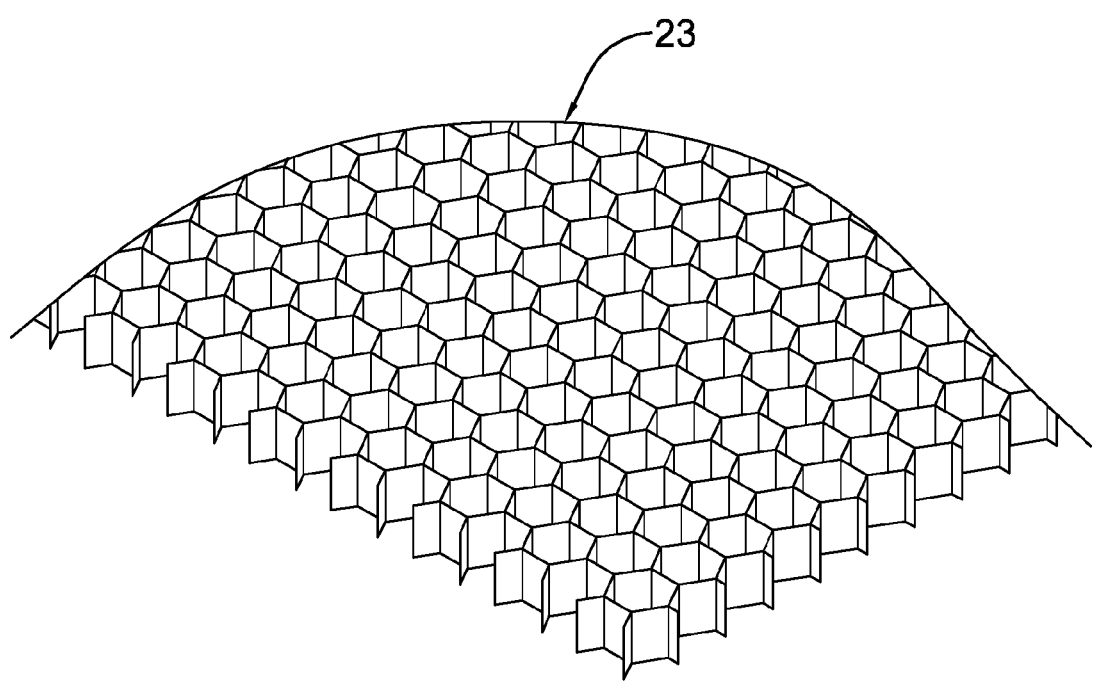
FIG. 3 is an enlarged perspective view of a body of the floating unit in FIG. 2.

With further reference to FIGS. 2 and 3, the floating units 2 are respectively mounted in the locating areas 1C of the frame assembly 1, are connected to the beams 10A, 10B of the holding frame 1A and each floating unit 2 has a hollow outer casing 20 and a body 23. The outer casing 20 is mounted in one of the locating areas 1C of the holding frame 1A between the corresponding beams 10A, 10B, is connected to the adjacent beams 10A, 10B and has a casing body 21 and a top board 22.

The casing body 21 may be made of a metal panel by bending and welding or by compressing, is mounted in the locating area 1C of the holding frame 1A between the corresponding beams 10A, 10B that form the locating area 1C and has an opening top, a closed bottom, an internal surface, a chamber 211 and a connecting flange 212. The closed bottom of the casing body 21 abut the top faces of the first holding segments 12 and the second holding segments 13 of the corresponding beams 10A, 10B. Glue can be applied on the internal surface of the casing body 21. The chamber 211 is square, is formed in the casing body 21 and communicates with the opening top of the casing body 21.

The connecting flange 212 is formed annularly on and protrudes from the casing body 21 around the top opening of the casing body 21 and abuts the beams 10A, 10B that form the corresponding locating area 1C of the holding frame 1A. With reference to FIGS. 4 and 5, the connecting flange 212 is formed on and protrudes from the casing body 21, is parallel with the fixed board 14 of the connecting seat 11 and has a width. The width of the connecting flange 212 may be same as the width of the fixed board 14 as shown in FIG. 4 or may be half of the width of the fixed board 14 as shown in FIG. 5. With reference to FIG. 6, the connecting flange 212 is formed on and protrudes from the casing body 21, extends into the fixed board 14 of the connecting seat 11, is parallel with the side panels 141 of the fixed board 14 and has a width. The width of the connecting flange 212 may be wider than the widths of the side panels 141 of the fixed board 14 as shown in FIG. 6.

The top board 22 is mounted on the connecting flange 212 of the casing body 21 over the chamber 211 of the casing body 21 to close the top opening of the casing body 21. With reference to FIG. 4, the top board 22 is stacked between the fixed board 14 and the top board 22 of the adjacent outer casing 20 and is securely connected to the fixed board 14 and the adjacent top board 22 by fasteners 24. With reference to FIG. 5, the top board 22 is stacked on the fixed board 14 and is securely connected to the fixed board 14 by fasteners 24. With reference to FIG. 6, the top board 22 is stacked on the connecting seat 11 of a corresponding longitudinal beam 10A and is securely connected to the side panels 141 of the fixed board 14 by fasteners 24.

The body 23 is lattice, may be a honeycomb core or a turbo-grid board, is mounted in the chamber 211 between the casing body 21 and the top board 22 and may be adhered with the internal surface of the casing body 21 by glue.

In the present invention, the body 23 of each outer casing 20 is mounted in the chamber 211 in the corresponding casing body 21, and the top board 22 is securely connected to the connecting flange 212 of the corresponding casing body 21 and the fixed boards 14 of the corresponding beams 10A, 10B by fasteners 24 to hold and close the body 23 between the casing body 21 and the top board 22. Thus, the glue that applied between the internal surface of the casing body 21 and the body 23 will not decomposed by the storage fluid in the storage tank. In addition, the floating units 2 can be securely mounted in the locating areas 1C of the frame assembly 1 by fasteners 24 without welding or sticking and this can reduce the heat-sealing cost of production and reduce the VOC loss. Furthermore, each floating unit 2 can be securely connected to the corresponding beams 10A, 10B by fasteners 24 and each beam 10A, 10B has the holding segments 12, 13 to abut and hold the closed bottom of the corresponding casing body 21 and this can enhance the structural strength of the floating cover roof.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A floating cover roof for a storage tank comprising:
a frame assembly having
a holding frame having
an outer periphery;
multiple longitudinal beams and each longitudinal beam having
a cross sectional shape;
a connecting seat having
a top;
a bottom;
two opposite sides; and
a fixed board formed on the top of the connecting seat and having a width;
a first holding segment mounted on and protruding from one of the opposite sides at the bottom of the connecting seat and having a top face; and
a second holding segment mounted on and protruding from the other opposite side at the bottom of the connecting seat and having a top face; and
multiple transverse beams, each two of the transverse beams connected to two adjacent longitudinal beams to form a locating area between said two transverse beams and said two adjacent longitudinal beams, and each transverse beam having the same cross sectional shape and structures as those of a corresponding one of the longitudinal beams; and
an outer rim mounted around the outer periphery of the holding frame to hold the beams of the holding frame in the outer rim; and
multiple floating units respectively mounted in the locating areas of the frame assembly, connected to the beams of the holding frame and each floating unit having
a hollow outer casing mounted in one of the locating areas of the holding frame between the corresponding beams, connected to the adjacent beams and having
a casing body mounted in the locating area of the holding frame between the corresponding beams that form the locating area and having an opening top;
a closed bottom abutting the top faces of the holding segments of the corresponding beams that form the locating area;
an internal surface;
a chamber being square, formed in the casing body and communicating with the opening top of the casing body; and
a connecting flange formed annularly on and protruding from the casing body around the opening top of the casing body and abutting the corresponding beams that form the locating area of the holding frame; and a top board mounted on the connecting flange of the casing body over the chamber of the casing body to close the opening top of the casing body.

2. The floating cover roof as claimed in claim 1, wherein each floating unit has a body being a lattice board and mounted in the chamber between the casing body and the top board.

3. The floating cover roof as claimed in claim 2, wherein the connecting seat of each longitudinal beam is quadrate; the fixed board is flat;
the first holding segment of each longitudinal beam is misaligned with the second holding segment of the corresponding longitudinal beam;
the connecting flange of each casing body is formed on and protrudes from the corresponding casing body, is parallel with the fixed board of the corresponding connecting seat and has a width same as the width of the fixed board; and
the top board of each outer casing is stacked between a corresponding fixed board and the top board of the adjacent outer casing and is securely connected to the fixed board and the adjacent top board by fasteners.

4. The floating cover roof as claimed in claim 2, wherein the connecting seat of each longitudinal beam is quadrate; the fixed board is flat;
the first holding segment of each longitudinal beam aligns with the second holding segment of the corresponding longitudinal beam;
the connecting flange of each casing body is formed on and protrudes from the corresponding casing body parallel the fixed board of the corresponding connecting seat and having a width half the width of the fixed board; and
the top board of each outer casing is stacked on a corresponding fixed board and is securely connected to the fixed board by fasteners.

5. The floating cover roof as claimed in claim 2, wherein the connecting seat of each longitudinal beam is T-shaped;
the fixed board is bent and has two side panels facing each other and each side panel having a width;
the first holding segment of each longitudinal beam aligns with the second holding segment of the corresponding longitudinal beam;
the connecting flange of each casing body is formed on and protrudes from the corresponding casing body, extends into the fixed board of the corresponding connecting seat and is parallel the side panels of the fixed board and having a width wider than the widths of the side panels of the fixed board; and
the top board of each casing body is stacked on the connecting seat of a corresponding longitudinal beam and is securely connected to the side panels of the fixed board by fasteners.

* * * * *